United States Patent [19]

Midler, Jr.

[11] 3,996,018
[45] Dec. 7, 1976

[54] CRYSTALLIZATION SYSTEM AND METHOD USING CRYSTAL FRACTURING EXTERNAL TO A CRYSTALLIZATION COLUMN

[75] Inventor: Michael Midler, Jr., East Brunswick, N.J.

[73] Assignee: Merck & Co., Inc., Rahway, N.J.

[22] Filed: Jan. 29, 1976

[21] Appl. No.: 653,402

Related U.S. Application Data

[63] Continuation of Ser. No. 522,910, Nov. 11, 1974.

[52] U.S. Cl. ............................ 23/295 R; 23/273 R; 23/301

[51] Int. Cl.[2] ............................................ B01D 9/02

[58] Field of Search ........... 23/301 R, 295, 313 FB, 23/273 R, 270 R

[56] References Cited

UNITED STATES PATENTS

| | | |
|---|---|---|
| 1,559,703 | 11/1925 | Howard ............................ 23/301 R |
| 1,845,742 | 2/1932 | Cocksedge ........................ 23/301 R |
| 3,391,003 | 7/1968 | Armstrong et al. ........ 23/313 FB X |
| 3,510,266 | 5/1970 | Midler, Jr. ......................... 23/273 R |
| 3,642,534 | 2/1972 | De Cremoux ..................... 23/273 R |
| 3,748,103 | 7/1973 | Bean et al. ................. 23/313 FB X |

Primary Examiner—Wilbur L. Bascomb, Jr.
Assistant Examiner—Barry I. Hollander
Attorney, Agent, or Firm—Harry E. Westlake, Jr.; William H. Nicholson

[57] ABSTRACT

Crystals are grown in a column through which a supersaturated solution flows upwardly while large crystals having one dimension substantially greater than another dimension taken from the bottom of the column are fractured externally of the column and the fractured particles are returned to the upper end of the column where fines are separated from larger seed type particles.

10 Claims, 8 Drawing Figures

CRYSTALLIZATION SYSTEM AND METHOD USING CRYSTAL FRACTURING EXTERNAL TO A CRYSTALLIZATION COLUMN

This is a continuation of application Ser. No. 522,910 filed Nov. 11, 1974.

BACKGROUND OF THE INVENTION

1. Field of the Invention

This invention relates to fluid bed crystallization systems and more particularly it concerns a novel crystal fracturing arrangement for obtaining improved operation in the growth and recovery of certain types of crystals.

2. Description of the Prior Art

U.S. Pat. No. 3,510,266 describes systems for production of crystals in a fluidized bed using ultrasonic vibrations. In brief, the systems of that patent incorporate a tubular crystalizer column arranged to extend in a generally vertical direction. A supersaturated solution is caused to flow into the column at a location near its lower end and then to flow upwardly through the column. Seed crystals of the solute material initially introduced near the upper end of the column; and these induce additional solute material to come out of the supersaturated solution and onto them. The seed crystals thus grow in size and sink downwardly in the column against the upward liquid flow. At a certain level in the column these crystals collect as a bed of crystals which is kept fluidized by the upward movement of liquid through it. The movement of supersaturated solution over the fluidized crystals causes them to grow. From time to time some of these grown crystals are extracted from the bed. Other crystals, however, grow quite large, and because of their size and weight, they progress down to the bottom of the column. An ultrasonic transducer is located at the bottom of the column; and when the large crystals encounter the transducer they are fractured by the high frequency vibrations which it emits. This results in the production of a great number of smaller crystals which are carried upwardly with the saturated liquid flow in the column. Some of these smaller crystals are extracted as above described while others serve as seed crystals and continue to grow in the column so that the system, when properly controlled, is self seeding.

The system described in U.S. Pat. No. 3,510,266 has been found to be especially effective in the processing of DL-α-acetamido-α-vanillyl propionitrile, and similar materials whose crystals are of compact shape and fracture into well defined compact particles.

SUMMARY OF THE INVENTION

The present invention provides improvements to fluidized bed crystallizers which process crystals of a particular geometry, namely, one in which one dimension of the crystal is substantially greater than another dimension. Such crystals may, for example, have the shape of thin plates or needles. Crystals having a large disparity between two dimensions are quite brittle and they tend to fracture in the manner of plate glass; that is, they tend to splinter and form large numbers of extremely small particles or fines in addition to larger particles. Moreover, in certain cases even the larger particles have whisker-like formations covering their surfaces.

It has been found that when crystals as described above are fractured, the resulting fines and whiskered formations that are produced tend to "fluff" or agglomerate with each other and with other particles. When such particles and fines are introduced to a saturated solution flowing through a fluidized bed of crystals they tend to stick to the crystals and cause clogging of the fluid flow through the column. Moreover these fines and agglomerates provide very poor seeding characteristics in a crystallizer column.

According to the present invention there is provided a novel ultrasonic fracturing arrangement which is external to a crystallizer column and which is incorporated with a novel crystal reintroduction loop. This novel fracturing arrangement permits the fracturing of needle or plate-like crystals while avoiding to a great extent, the above described interference with fluid flow in the column. The present invention, moreover, provides for automatic reseeding of the crystallizer column; and it additionally makes possible the recovery of crystalline fines for use or for redissolution.

According to the present invention there is provided a fluidized bed crystallization apparatus comprising a crystallizer column with means for pumping a supersaturated liquid to flow up through the column while seed crystals grow in the column to form a fluidized bed therein. An ultrasonic crystal fracturing unit is provided externally of the column and a conduit system, including a pump, is provided to transfer a slurry of large crystals and solution from near the bottom of the column to the fracturing unit. The crystals are broken up in the fracturing unit and the resulting particles are carried on out of the unit by the continuous and rather rapid flow of slurry through the unit. This flow is directed, via a return conduit, to a location in the column above the fluidized crystal bed where crystal particles are reintroduced into the upward flow of solution in the column. Because of the rapid flow of the broken up crystals and fines between the cavitation chamber and the upper end of the column, only little, if any, agglomeration takes place and continuous uninterrupted flow is maintained. The fines, and larger particles from the crystal fracturing unit become separated by the upward flow of solution in the column, with the fines being carried on out from the top of the column and the larger particles settling down to the fluidized bed as seed crystals.

In a preferred embodiment filter means are provided in the outlet from the upper end of the column to recover the crystal fines which have been separated and carried out of the column.

According to a further aspect of the invention there is provided a novel reintroduction structure which allows the high velocity flow of broken crystals, fines and solution from the fracturing unit to be introduced into the relatively tranquil upward flow of solution within the column without the production of eddys and other flow disturbances which tend to trap the fines and prevent their elimination. According to this last mentioned aspect, the high velocity reintroduction flow into the column is directed tangentially into a small pipe or tube opened at both ends and disposed inside the column coaxially therewith. The high velocity flow into the pipe or tube swirls around inside the tube and dissipates its kinetic flow energy without appreciable interference with the main upward flow of solution in the column.

There has thus been outlined rather broadly the more important features of the invention in order that the detailed description thereof that follows may be better understood, and in order that the present contribution to the art may be better appreciated. There are of course, additional features of the invention that will be described hereinafter and which will form the subject of the claims appended hereto. Those skilled in the art will appreciate that the conception upon which this disclosure is based may readily be utilized as a basis for the designing of other structures or methods for carrying out the several purposes of the invention. It is important, therefore, that the claims be regarded as including such equivalent constructions and methods as do not depart from the spirit and scope of the invention.

BRIEF DESCRIPTION OF THE DRAWINGS

One embodiment of the invention has been chosen for purposes of illustration and description, and is shown in the accompanying drawings forming a part of the specification, wherein:

FIG. 2 is an enlarged fragmentary view showing an arrangement for introducing a supersaturated solution into a crystallizer column in the system of FIG. 1;

FIG. 3 is an elevational section view showing an ultrasonic crystal fracturing unit which may be used in the system of FIG. 1;

DETAILED DESCRIPTION OF THE PREFERRED EMBODIMENT

Figure 1:
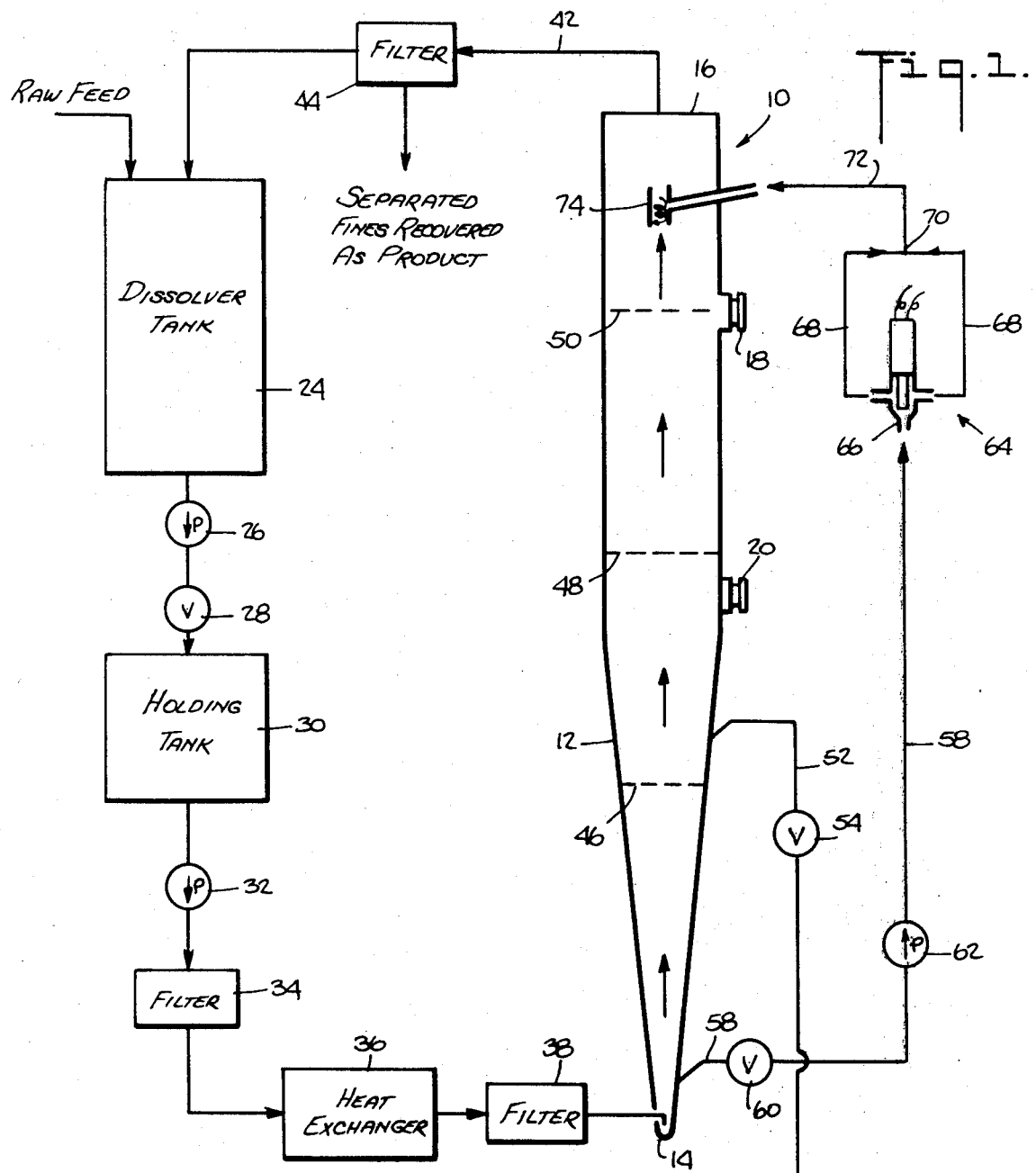
FIG. 1 is a schematic diagram showing a crystal production system in which the present invention is embodied.

The crystal production system of FIG. 1 is similar in overall construction and operation to that described in U.S. Pat. No. 3,510,266, which is incorporated herein by reference.

As shown in FIG. 1, there is provided a crystallizer column 10 of generally tubular configuration and arranged in a generally vertical or upright condition. The lower end of the column is formed with a tapered region 12 which terminates at the bottom in a rounded cup shaped bottom plate 14. The top of the column is closed by a cover plate 16. The column 10 is preferably made of stainless steel and various temperature control means (not shown) are provided in and around the column to optimize the reactions which take place therein. Sight glass windows 18 and 20 are provided at different levels of the column to observe the level of the crystal bed within the column.

Material to be crystallized in the column 10 is supplied via a raw feed input 22 to a dissolver tank 24 where it is placed into solution with a liquid in the tank. When sufficient feed material is dissolved into the solution to bring the solution to a fully saturated state, the solution is transferred from the dissolver tank 24 via a pump 26 and a valve 28 to a holding tank 30. From there the solution is pumped by means of a further pump 32 through a second filter 34, a heat exchanger 36 and a second filter 38 to the lower end of the column 10. The heat exchanger 36 cools the solution and brings it to a supersaturated condition before it is introduced into the bottom of the column 10.

As shown in FIG. 2, the supersaturated solution is introduced into the bottom of the column 10 via a solution feed line 40 which is bent downwardly inside the column to direct flow against the rounded cup shaped bottom plate 14. This causes fluid flow to be distributed about the periphery of the column and to follow the sides of the column up towards the top plate 16 as indicated by the arrows A in FIG. 2.

Reverting to FIG. 1, it will be seen that the upward flowing solution in the tapered region 12 of the column 10 encounters a gradually increasing column cross section. As a result the lineal flow velocity of the solution decreases as it moves upwardly. Eventually the solution reaches the top of the column and passes out of the column via a recirculation line 42. This exiting solution passes through a fines recovery filter 44 and is then directed back into the dissolver tank 24 there it is combined with additional raw feed.

As the supersaturated solution moves upwardly through the column 10, it encounters seed crystals of the feed material. Because the solution is supersaturated with this same feed material, the seed crystals cause additional amounts of the feed material to come out of solution and to crystallize on them. The seed crystals thus grow until their size and weight are such that they move downwardly in the column against the upward flow of solution. This results in a bed of crystals in the column which may have an upper level shown by a first horizontal dashed line 46. Depending upon the flow velocity in the column and the rate of crystallization the upper level of the bed may sooner or later reach an intermediate or an upper level, as indicated by second and third dashed horizontal lines 48 and 50. The presence of the fluidized crystal bed at these levels can be observed through the sight glasses 18 and 20.

A product crystal recovery line 52 is positioned in the column 10 below the upper level of the fluidized crystal bed for the purpose of drawing off crystals as product material. These crystals, and an accompanying amount of feed solution pass through a valve 54 in the recovery line 52 to a crystal separator 56 where the crystals are separated, as product material, from the accompanying feed solution. As indicated, the separated feed solution is returned to the dissolver tank.

Some of the crystals in the column 10 become too large for proper fluidization of the crystal bed; and these larger crystals migrate down to the bottom of the column. As shown in FIG. 1, and in accordance with the present invention, these larger crystals are drawn off, as a slurry with some of the solution, from near the bottom of the column 10. This slurry is extracted via a bypass line 58. The slurry in the line 58 moves through a bypass valve 60 and pump 62 to an ultrasonic crystal fracturing unit 64 which it enters via a common bottom inlet port 66. As will be described more fully hereinafter, the crystals are broken up in the fracturing unit 64 and the resulting fines are smaller crystal particles pass out of the unit via a pair of symmetrically disposed branch lines 68. These branch lines are joined at a junction 70 above the crystal fracturing unit. As a result, the fines and other crystal particles move rapidly from the junction 70, through a common reintroduction line 72 to a reentry unit 74 located inside the column 10 above the upper level of the fluidized bed therein. When this re-entry flow of fines and other crystal particles encounters the upward flow of solution in the column a separation takes place with the fines and smaller particles being carried up out of the column by the upward flow, and the heavier and larger particles settling down against the upward flow until they reach the fluidized crystal bed. These larger particles then serve as seed crystals and begin to grow in the bed. The lightweight fines, which are carried out from the top of the column 10, are directed through the fines recovery filter 44 where they are separated from the accompanying solution. As indicated in FIG. 1, these fines are then recovered as additional product.

It will be noted that the crystal fracturing unit 64 is arranged to provide a continuous through flow of crystals and solution outside the column 10 from its lower end to the re-entry unit 74 near its upper end. This bypass flow does not interfere with the normal flow of solution in the column. Moreover, the bypass flow may be made quite rapid to prevent agglomeration and "fluffing" of the fines and other particles produced by the action of the crystal fracturing unit 64.

FIG. 3 shows the general construction of the ultrasonic crystal fracturing unit 64. As shown, this unit comprises a main cylindrical chamber 76 closed at its bottom end by a lower fitting 78 and at its upper end by a vibrator device 80. The fitting 78 has a central opening therein which forms the inlet port 68. A transducer element 82 extends down from the vibrator device 80 into the chamber 76 where it vibrates at ultrasonic frequencies in accordance with the driving action of the vibrator device 80. The vibrator device itself may be any well known electromechanical oscillator or horn which produces mechanical vibrations in response to applied electrical signals.

The two output branch lines 68 extend out laterally from inside the chamber 76 on opposite sides of the transducerent 82. It will be seen that this arrangement provides a direct through flow of material from the inlet port 66 to the output branch lines 68 while exposing the flow fully to the direct vibratory action of the transducer element. Thus the arrangement shown in FIGS. 1 and 3 ensures maximum crystal breakup while maintaining continuous and rapid flow to prevent agglomeration and clogging of the conduits or lines 58, 68 and 72.

Figure 4:
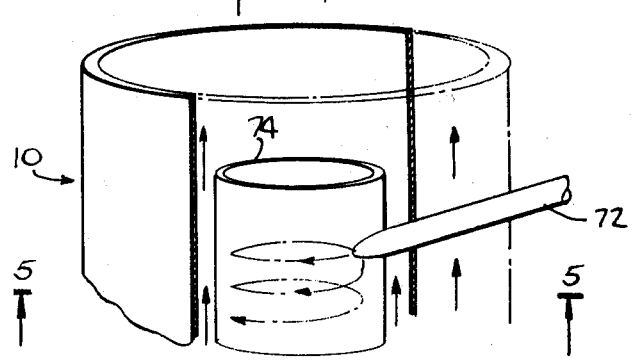
FIG. 4 is a perspective view, partially cut away, showing a crystal reintroduction structure which may be used in the system of FIG. 1.
Figure 5:
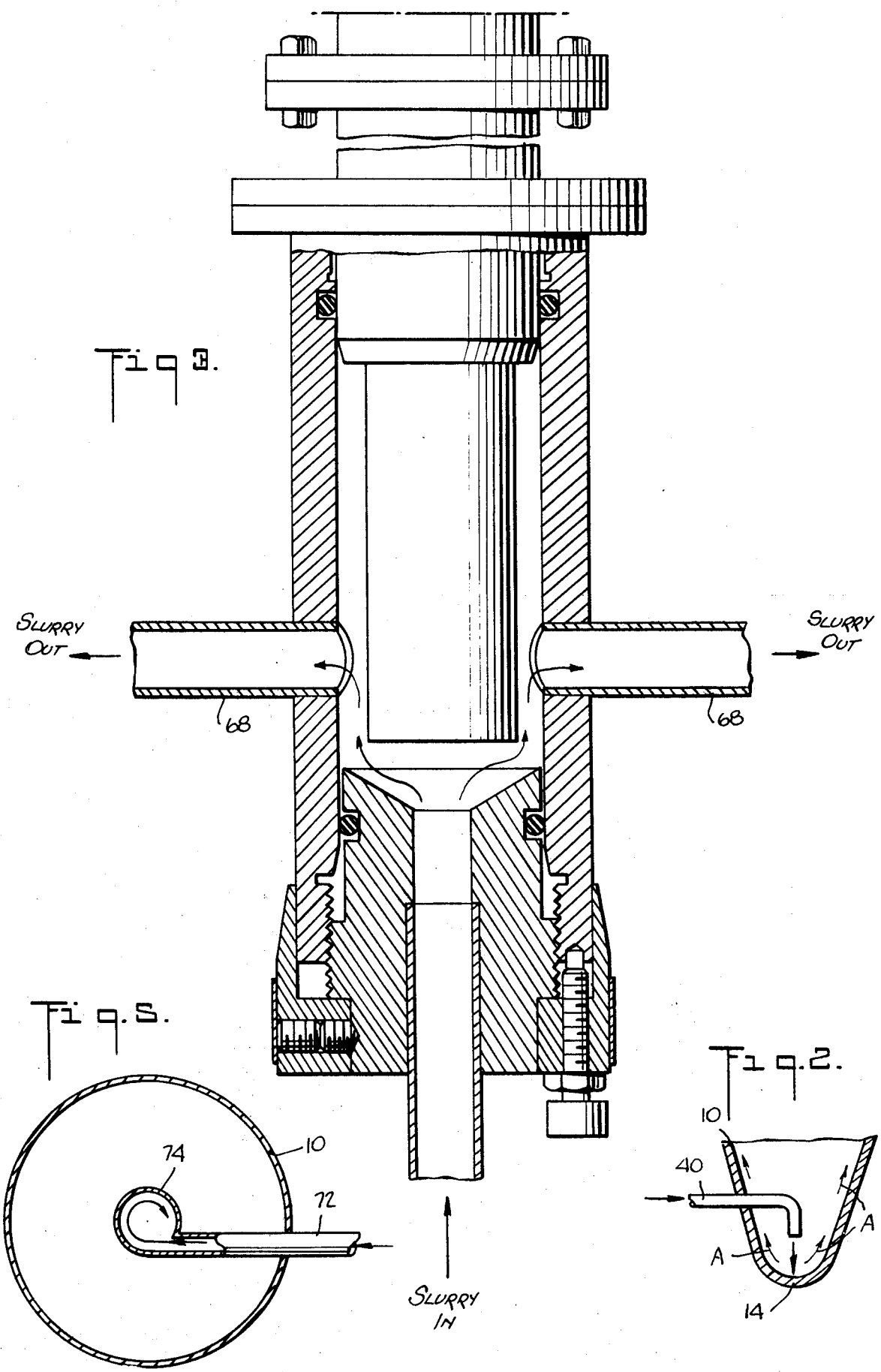
FIG. 5 is a cross section view taken along line 5—5 of FIG. 4.

FIGS. 4 and 5 illustrate a reintroduction arrangement by which the high velocity flow from the disintegration unit 64 is introduced into the relatively tranquil upward flow in the column 10 without creation of eddys or other turbulent conditions which could entrap fines in the column and cause agglomeration and clogging. As shown in FIGS. 4 and 5, there is provided a short length of tubing 86 positioned coaxially within the upper region of the column 10. This tubing is opened at both ends. The reintroduction line 72 passes in through the side of the column 10 and opens into the tubing 86. As can be seen in FIGS. 4 and 5, the reintroduction line 72 is oriented so that it opens tangentially of the interior of the tubing 86. Thus, the high velocity flow from the reintroduction line is caused to swirl around inside the tubing 86 in helical fashion as illustrated by the arrow B in FIG. 4. This allows the high kinetic energy of the incoming fluid and crystals to be dissapated without affecting the smooth upward flow of fluid in the main portion of the column. The diameter of the tubing 86 is preferably less than one sixth the column diameter.

Figure 6:
FIG. 6 is a highly magnified photograph showing crystals which may be successfully processed with the present invention.
Figure 7:
FIG. 7 is a highly magnified photograph showing fines and agglomerates which form upon fracture of the crystals of FIG. 5 in prior art systems.
Figure 8:
FIG. 8 is a highly magnified photograph showing crystals and fines obtained according to the present invention.

The photographs of FIGS. 6-8 are useful in visualizing the problem which is overcome by the present invention and the beneficial effects which the invention provides. FIG. 6 shows seed crystals of an L-isomer of the compound L-α-hydrazino-α-(3,4, dihydroxybenzyl) propionic acid, otherwise known as Carbidopa. These crystals are characterized by an elongated needle-like configuration. As the crystals move downwardly through the column 10 (FIG. 1) they maintain this elongated needle-like configuration during their growth. When crystals of this nature are fractured by ultrasonic vibrations they shatter somewhat in the manner of plate glass. As a result there are formed in addition to a number of major fragments, a very large number of extremely small fragments or fines, as can be seen in FIG. 7. Moreover, when crystals of this type fracture, the surfaces of the larger particles wiskered with very small hairlike projections. The fines and the hairlike projections have a high attraction for each other; and where, as in FIG. 7, the solution containing them is not kept moving at high velocity, they tend to agglomerate and form large fluffy structures of low density and large volume. If these structures form in the column 10 they interfere with the upward flow of solution in the column and prevent the proper flow of solution through the fluidized crystal bed. Moreover, these agglomerates or fluffy structures have relatively low surface area for the volume they occupy and therefore they are quite inefficient in regard to the promotion of crystal growth in the column.

FIG. 8 shows the condition of crystals which have been broken down by the ultrasonic crystal fracturing unit 64 of the system of FIG. 1. As can be seen, the crystal particles are maintained separated from each other so that they do not agglomerate. This condition is achieved by the continuous flow maintained through the lines 58, 68 and 72 and the fracturing unit 64. The larger particles, when returned to the upper end of the column, serve in the column as seed crystals, while the smaller particles and fines are carried out of the column by the flow therein.

It will be appreciated that the arrangements described herein facilitate the processing, in a crystallization column system, of thin fragile crystals which tend to shatter or splinter upon fracturing. Although the specific embodiment has been described in connection with needle shaped crystals the special advantages of the invention are also realized in the processing of any crystals having one dimension substantially greater than another dimension.

Having thus described the invention with particular reference to those preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secure by Letters Patent is:

1. A fluidized bed crystallization apparatus for crystals having one dimension substantially greater than another dimension comprising a tubular crystallizer column, means connected to maintain a continuous upward flow of supersaturated fluid within said column and to maintain a bed of crystals fluidized therein, a crystal fracturing device located externally of said column, a first conduit connected between near the bottom of said column and said fracturing device, a further conduit connected between said fracturing device and said column above the upper level of said bed, and pumping means in one of said conduits to maintain a continuous flow from the column through said first conduit, said fracturing device, said further conduit and back into said column, a conduit connected between said column above the lower level of said bed and a crystal product separator, and an output conduit for conducting flow of solution out from the upper end of said column.

2. A fluidized bed crystallization apparatus according to claim 1 wherein the fracturing device is an ultrasonic crystal fracturing unit.

3. A fluidized bed crystallization apparatus according to claim 2 wherein said crystal fracturing unit comprises a chamber having a transducer rod extending into it, a single input connection opening into said chamber axially of said transducer rod and a pair of symmetrically disposed lateral output connections which communicate via branch lines with a common junction in said further conduit.

4. A fluidized bed crystallization apparatus according to claim 1 wherein said further conduit opens into a tubular member positioned inside the column coaxially therewith, said tubular member being open at both ends and said further conduit being oriented tangentially of said tubular member.

5. A fluidized bed crystallization apparatus according to claim 1 wherein a fines recovery filter is interposed in said output conduit at the upper end of said column.

6. A method of producing crystals having one dimension substantially greater than another dimension from a supersaturated solution, said method comprising the steps of causing said supersaturated solution to flow upwardly through a column in which a fluidized bed of crystals is maintained, and during such flow, extracting large crystals from near the bottom of said column, fracturing the extracted crystals outside the column and flowing the resulting fractured crystal particles back into the column above said fluidized bed of crystals.

7. A method according to claim 6 wherein the flow of extracted crystals and fractured crystal particles is maintained continuously to prevent agglomeration.

8. A method according to claim 6 wherein solution flowing up through said column is conducted out from said column and is then filtered to recover fines from the fractured crystal particles which have been flowed back into the column.

9. A method according to claim 6 wherein the fractured crystal particles are directed inside said column to flow along a confined helical path to dissipate their linear velocity without appreciably affecting the upward flow of solution inside the column.

10. A fluidized bed crystallization system for crystals having one dimension substantially greater than another dimension comprising, a feed material dissolver tank, means for supplying feed material to be crystallized and a feed material solvent to said dissolver tank, a tubular crystallization column, means coupling said dissolver tank to said column to supply a supersaturated solution of feed material from said dissolver tank to said column to flow continuously in an upward direction through said column, and through a fluidized bed of crystals of said feed material maintained in said column, a crystal fracturing device located externally of said column, a first conduit connected between said column below the upper level of said bed and said fracturing device, a further conduit connected between said fracturing device and said column above the upper level of said bed, pumping means in one of said conduits to maintain a continuous flow from the column through the first conduit, the fracturing device, the further conduit and back into the column, a return line extending from said column above said further conduit to said dissolver tank and a fines recovery filter interposed in said return line for recovery of crystal fines from said solution, and a conduit connected between said column above the lower level of said bed and a crystal product separator.

* * * * *